United States Patent
Kwon et al.

(10) Patent No.: US 8,185,042 B2
(45) Date of Patent: May 22, 2012

(54) APPARATUS AND METHOD OF IMPROVING SOUND QUALITY OF FM RADIO IN PORTABLE TERMINAL

(75) Inventors: Hyou-Joo Kwon, Seoul (KR); Hwang-Pyo Hong, Gyeonggi-do (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 270 days.

(21) Appl. No.: 12/698,244

(22) Filed: Feb. 2, 2010

(65) Prior Publication Data

US 2010/0197247 A1    Aug. 5, 2010

(30) Foreign Application Priority Data

Feb. 4, 2009    (KR) .................. 10-2009-0008847

(51) Int. Cl.
*H04H 40/00*    (2008.01)
*H04K 3/00*    (2006.01)

(52) U.S. Cl. .................................... 455/3.06; 455/556.1

(58) Field of Classification Search ............... 455/3.06, 455/556.1, 556.2; 381/86
See application file for complete search history.

(56) References Cited

U.S. PATENT DOCUMENTS

| | | | |
|---|---|---|---|
| 7,006,807 B2* | 2/2006 | Szczublewski et al. | 455/227 |
| 7,657,337 B1* | 2/2010 | Evans et al. | 700/94 |
| 2006/0280314 A1* | 12/2006 | Okada et al. | 381/71.1 |

* cited by examiner

*Primary Examiner* — Lee Nguyen
(74) *Attorney, Agent, or Firm* — Cha & Reiter, LLC.

(57) ABSTRACT

Provided are an apparatus and a method of improving the sound quality of an FM radio signal in a portable terminal. The apparatus includes: an FM radio module receiving an FM radio signal; an application processor processing an application program for playing an audio signal; a switch selectively switching to transmit an audio signal processed in the application processor or the FM radio signal received through the FM radio module into an audio sub system; the audio sub system decoding and post-processing the audio signal or the FM signal, which is provided through the switch; and an amplifier amplifying the signal decoded and post-processed in the audio sub system and output the amplified signal to an external.

17 Claims, 2 Drawing Sheets

APPARATUS AND METHOD OF IMPROVING SOUND QUALITY OF FM RADIO IN PORTABLE TERMINAL

CLAIM OF PRIORITY

This application claims the benefit of an earlier application filed in the Korean Intellectual Property Office on Feb. 4, 2009 and assigned Serial No. 10-2009-0008847, the contents of which are incorporated herein by reference.

BACKGROUND OF THE INVENTION

1. Field of the Invention

The present invention relates generally to an FM radio, and in particular, to an apparatus for improving the sound quality of an FM radio in a portable terminal.

2. Description of the Related Art

The portable terminal becomes extensively used due to convenience of its portability. Accordingly, portable terminal manufacturers have been currently developing portable terminals for supporting additional services (such as wireless internet, a camera, an MP3 player, and an FM radio) to attract even more consumers.

If the portable terminal supports an FM radio function, it typically includes an FM radio module for receiving an FM radio signal. In this case, the portable terminal amplifies the received FM radio signal through the FM radio module, and outputs the amplified signal through a speaker or an earphone.

As mentioned above, the portable terminal including an FM radio function may tune the volume of an FM radio signal through a gain adjustment of an amplifier. However, the FM radio signal is vulnerable to noise in current portable terminals.

SUMMARY OF THE INVENTION

An object of the present invention is to provide an apparatus and a method of improving the sound quality of an FM radio signal in a portable terminal.

Another object of the present invention is to provide an apparatus and a method of improving the sound quality of an FM radio signal by a post-processing an FM radio signal in a portable terminal.

According to an aspect of the present invention, an apparatus for receiving an FM radio signal in a portable terminal includes: an FM radio module receiving an FM radio signal; an application processor processing an application program for playing an audio signal; a switch switching to transmit an audio signal processed in the application processor or the FM radio signal received through the FM radio module into an audio sub system; the audio sub system decoding and post-processing the audio signal or the FM signal, which is provided through the switch; and an amplifier amplifying the signal decoded and post-processed in the audio sub system and output the amplified signal to an external.

According to another aspect of the present invention, a method of receiving an FM radio signal in a portable terminal includes: switching to transmit an FM radio signal received through the FM radio module into an audio sub system for decoding and post-processing a signal when an FM radio service is provided; switching to transmit an audio signal played in an application processor into the audio sub system when an audio signal is played; decoding and post-processing an FM radio signal or an audio signal, which is transmitted into the audio sub system through the switching; and amplifying the decoded and post-processed signal to output it to an external.

BRIEF DESCRIPTION OF THE DRAWINGS

The above features and advantages of the present invention will become more apparent to those skilled in the art from the following detailed description when taken in conjunction with the accompanying drawings in which.

DETAILED DESCRIPTION OF THE INVENTION

Preferred embodiments of the present invention will be described herein below with reference to the accompanying drawings. For the purposes of clarity and simplicity, detailed descriptions of well-known functions or constructions will be omitted as they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

Hereinafter, the present invention describes a technique for improving the sound quality of an FM radio signal in a portable terminal with an FM radio function.

Figure 1:
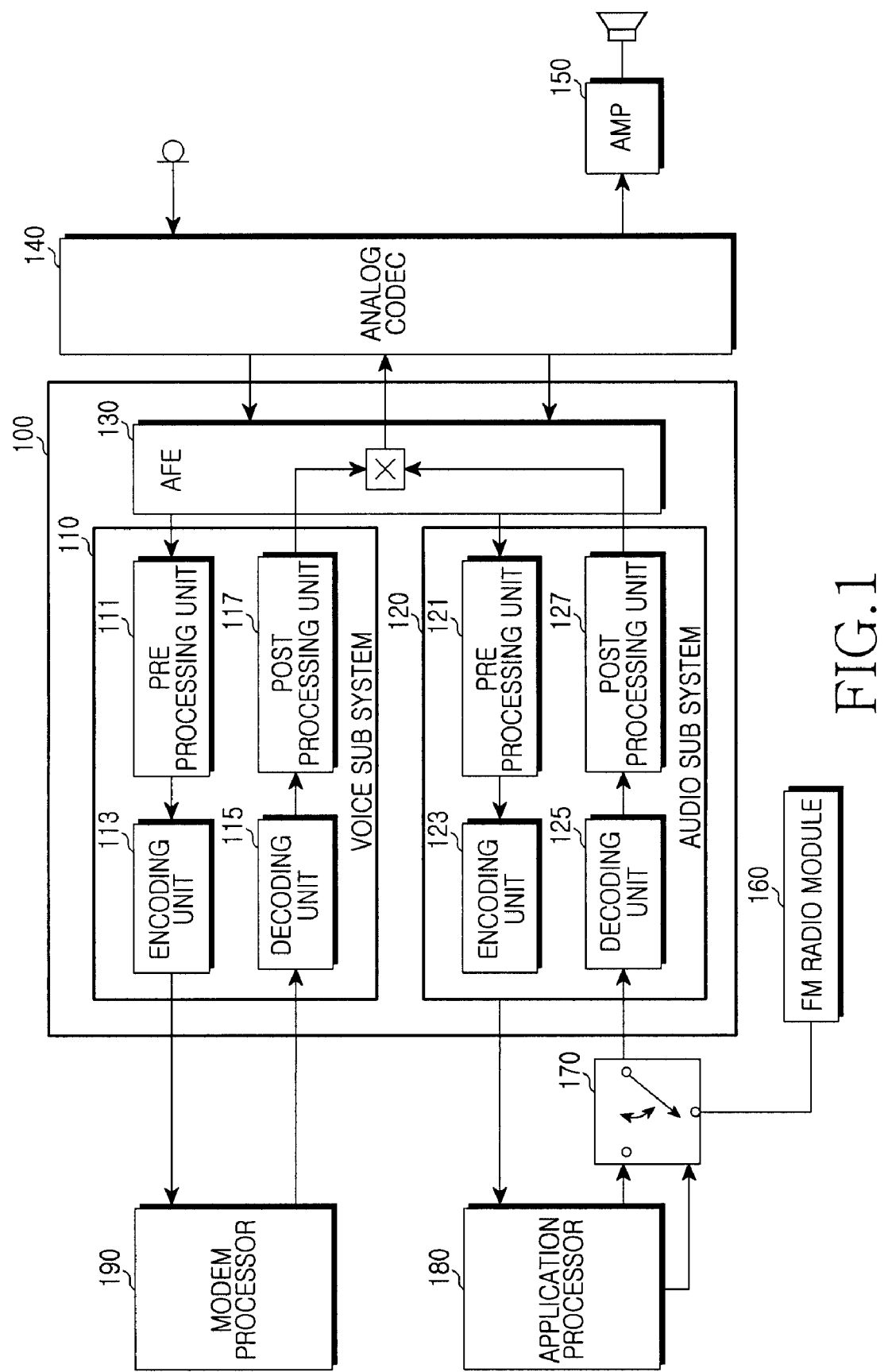
FIG. 1 is a view illustrating a configuration of a portable terminal for performing a post-processing on an FM radio signal according to the present invention.

According to the teachings of the present invention, the portable terminal performs a post-processing on an FM radio signal, which is received through an FM radio module, in order to improve the sound quality of the FM radio signal. For example, the portable terminal is configured as shown in FIG. 1 to perform the post-processing on an FM radio signal. It should be noted that the configuration of an audio system of a portable terminal shown in FIG. 1 with a communication function is for illustrative purposes, but may be identically applied to a portable terminal without having the communication function or may be applied to process signals other than FM radio signals.

FIG. 1 is a view illustrating a configuration of a portable terminal for performing a post-processing on an FM radio signal according to the present invention.

As shown in FIG. 1, the portable terminal is configured to include an audio system 100, an analog codec 140, an amplifier (AMP) 150, an FM radio module 160, a switch 170, an application processor 180, and a modem processor 190.

The audio system 100 further includes a voice sub system 110 for processing a voice signal, an audio sub system 120 for processing an audio signal, and an analog front end (AFE) 130.

The voice sub system 110 is configured to include a pre-processing unit 111, an encoding unit 113, a decoding unit 115, and a post-processing unit 117.

The pre-processing unit 111 performs pre-processing on a voice signal provided from the AFE 130 according to a pre-determined pre-processing method. For example, the pre-processing unit 111 is configured to include a first pre-processing unit for removing echo, a second pre-processing unit for automatic gain control (AGC), a third pre-processing unit for automatic volume control (AVC), and a fourth pre-processing unit for noise suppressor (NS). The pre-processing unit 111 activates only a corresponding pre-processing unit according to a predetermined pre-processing method among the first to fourth pre-processing units in the pre-processing unit 111, and then performs pre-processing on a voice signal provided from the AFE 130.

The encoding unit 113 encodes a voice signal provided from the pre-processing unit 111 and outputs the encoded signal to the modem processor 190.

The decoding unit 115 decodes a voice signal provided from the modem processor 190 and then outputs the decoded signal to the post-processing unit 117.

The post-processing unit 117 performs the post-processing on a voice signal provided from the decoding unit 115 according to a predetermined post-processing method. For example, the post-processing unit 117 includes a first post-processing unit for performing filtering according to a pulse code modulation, a second post-processing unit for AGC, and a third post-processing unit for AVC. The post-processing unit 117 activates only a corresponding post-processing unit according to a predetermined post-processing method among the first to third post-processing units in the post-processing unit 117, then performs the post-processing on a voice signal provided from the decoding unit 115.

The audio sub system 120 is configured to include a pre-processing unit 121, an encoding unit 123, a decoding unit 125, and a post-processing unit 127 in order to process an audio signal.

The pre-processing unit 121 performs pre-processing on an audio signal provided from the AFE 130 according to a predetermined pre-processing method. For example, the pre-processing unit 121 includes a first pre-processing unit for AGC and a second pre-processing unit for NS. The pre-processing unit 121 activates only a corresponding pre-processing unit according to a predetermined pre-processing method among the first and second pre-processing units in the pre-processing unit 111, then performs the pre-processing on an audio signal provided from the AFE 130.

The encoding unit 123 encodes an audio signal provided from the pre-processing unit 121 and outputs the encoded signal to the application processor 180.

The decoding unit 125 decodes an audio signal or an FM radio signal, provided from the switch 170, and then outputs the decoded signal to the post-processing unit 127.

The post-processing unit 127 performs post-processing on an audio signal or an FM radios signal, provided from the decoding unit 125, according to a predetermined post-processing method. For example, the post-processing unit 127 performs post-processing on an audio signal or an FM radios signal, provided from the decoding unit 125, in order to perform an equalizer function. At this point, the post-processing unit 127 may include a plurality of post-processing units, each of which performs a post-processing function.

The AFE 130 converts a digital signal, provided from the voice sub system 110 and the audio sub system 120, into an analog signal and outputs the converted signal into the analog codec 140. At this point, the AFE 130 combines signals from the voice sub system 110 and the audio sub system 120 into one signal and then outputs it.

Additionally, the AFE 130 converts a digital signal, provided from the analog codec 140, into an analog signal, and outputs the converted signal into the voice sub system 110 or the audio sub system 120.

The analog codec 140 controls a gain of an analog signal. That is, the analog codec 140 controls a gain of a signal, provided from the AFE 130, and then outputs it to the AMP 150. In addition, the analog codec 140 controls a gain of an analog signal received through an input device, then outputs it to the voice sub system 110 or the audio sub system 120. Here, an input device includes a microphone, a headset, or the like.

The AMP 150 amplifies an analog signal, provided from the analog codec 140, and outputs it to a speaker or a headset.

The FM radio module 160 receives an FM radio signal. For example, the FM radio module 160 includes a pin grid array (PGA) module, an analog/digital converter (ADC), and a digital signal processor (DSP).

The switch 170 selectively switches an audio signal provided from the application processor 180 and an FM radio signal provided from the FM radio module 160 into the audio sub system 120 in response to a control of the application processor 180. For example, while listening to MP3 music, the switch 170 switches to connect the application processor 180 with the audio sub system 120 in response to a control of the application processor 180. Moreover, while providing an FM radio service, the switch 170 switches to connect the FM radio module 160 with the audio sub system 120 in response to a control of the application processor 160.

The application processor 180 processes an application program for playing an audio signal that is encoded with an MP3 or advanced audio coding (AAC) format.

In addition, the application processor 180 controls the switch 170 to selectively switch an audio signal provided from the application processor 180 and an FM radio signal provided from the FM radio module 160 into the audio sub system 120 in response to a control of the application processor 180. At this point, the application processor 180 switches to connect the application processor 180 with the audio sub system 120 when an audio signal is transmitted.

The modem processor 190 processes a voice signal that is received and transmitted for voice communication.

Hereinafter, a method of performing post-processing on an FM radio signal in a portable terminal will be described.

Figure 2:
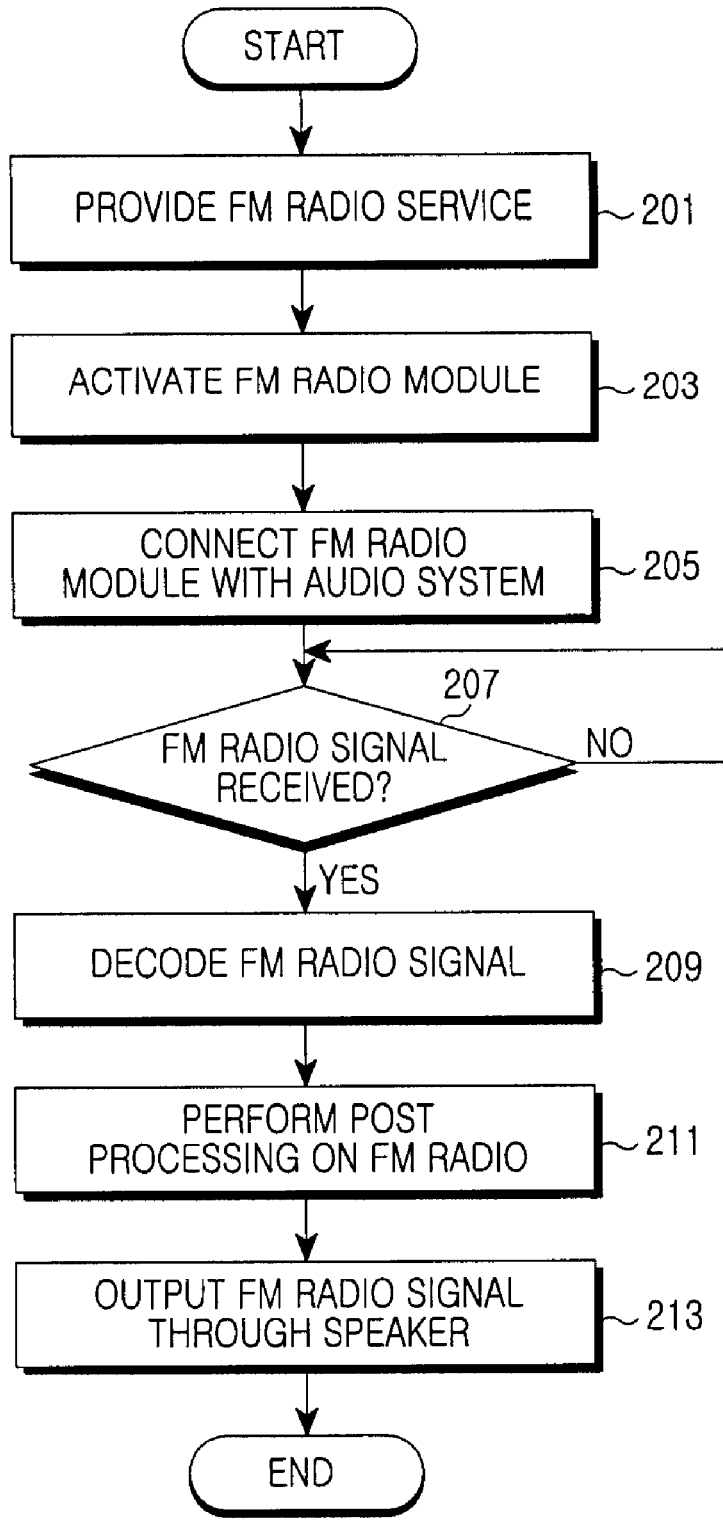
FIG. 2 is a view of a procedure for performing a post-processing on an FM radio signal in a portable terminal according to an embodiment of the present invention.

FIG. 2 is a view of a procedure for performing post-processing on an FM radio signal in a portable terminal according to an embodiment of the present invention.

Referring to FIG. 2, the portable terminal confirms whether an FM radio service is provided or not according to input information of a user in operation 201.

If an FM radio service is provided, the portable terminal proceeds to operation 203 and activates an FM radio module to provide the FM radio service.

At this point, the portable terminal proceeds to operation 205 and then connects the FM radio module with an audio system. For example, the portable terminal controls the switch 170 to connect the audio sub system 120 with the FM radio module 160 shown in FIG. 1.

After the FM radio module is connected to an audio system, the portable terminal proceeds to operation 207 and confirms whether an FM radio signal is received or not through the FM radio module.

If the FM radio signal is received, the portable terminal proceeds to operation 209 and decodes the FM radio signal received through the FM radio module. For example, the portable terminal decodes the FM radio signal, received through the FM radio module, using the decoding unit 125 of the audio sub system 120 of FIG. 1.

Next, the portable terminal proceeds to operation 211, and performs post-processing on the FM radio signal decoded in the operation 209 according to a predetermined post-processing method. For example, the portable terminal performs post-processing on the FM radio signal decoded in the operation 209, using the post-processing unit 127 of the audio sub system 120 shown in FIG. 1. At this point, the portable terminal performs post-processing on the FM radio signal by selecting at least one of post-processing methods including equalizing, base enhancement, automatic volume limiting, high frequency band improvement, noise reduction, volume setting, and three-dimensional sound.

After the post-processing of the FM radio signal, the portable terminal proceeds to operation 213 and outputs the FM radio signal, which is post-processed in the operation 211, through a speaker.

Next, the portable terminal terminates this algorithm.

As mentioned above, the portable terminal performs post-processing on an FM radio signal received through the FM radio module such that sound quality of the FM radio signal can be improved.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for receiving a radio signal in a portable terminal, comprising:
   a radio module receiving a radio signal;
   an application processor processing an application program for playing an audio signal;
   a switch switching to transmit an audio signal processed in the application processor or the radio signal received through the radio module into an audio sub system;
   the audio sub system decoding and post-processing the audio signal or the radio signal output from the switch; and
   an amplifier amplifying the signal decoded and post-processed in the audio sub system.

2. The apparatus of claim 1, wherein the application processor processes a program for playing an encoded audio signal.

3. The apparatus of claim 2, wherein the audio signal is encoded with an MP3 or advanced audio coding (AAC) format.

4. The apparatus of claim 1, wherein the switch switches to transmit the radio signal received through the radio module into the audio sub system during a radio mode.

5. The apparatus of claim 1, wherein the switch switches to transmit the audio signal played in the application processor into the audio sub system.

6. The apparatus of claim 1, wherein the audio sub system comprises:
   a decoding unit decoding an audio signal or a radio signal output from the switch;
   a post-processing unit performing post-processing on the decoded signal according to at least one of post-processing methods; and
   an analog pre-processing unit converting the signal, which is post-processed in the post-processing unit, into an analog signal.

7. The apparatus of claim 6, wherein the post-processing unit comprises at least one of post-processing methods including equalizing, base enhancement, automatic volume limiting, high frequency band improvement, noise reduction, volume setting, and three-dimensional sound.

8. The apparatus of claim 1, further comprising an input device receiving a voice signal or an audio signal, wherein the audio sub system pre-processes and encodes the audio signal provided from the input device.

9. The apparatus of claim 1, further comprising:
   a modem processor processing voice signal for voice communication; and
   a voice sub system decoding and post-processing a voice signal provided from the modem processor and pre-processing and encoding a voice signal provided from an input device to the modem processor.

10. The apparatus of claim 1, wherein the radio signal is an FM radio signal.

11. A method of receiving a radio signal in a portable terminal, the method comprising:
    selectively switching to transmit a radio signal received through the radio module into an audio sub system for decoding and post-processing a signal when a radio service is provided;
    switching to transmit an audio signal played in an application processor into the audio sub system when an audio signal is played;
    decoding and post-processing the radio signal or the audio signal by the audio sub system; and
    amplifying the decoded and post-processed signal.

12. The method of claim 11, further comprising:
    activating the FM radio module if a radio service is provided; and
    receiving an FM radio signal through the activated radio module.

13. The method of claim 12, wherein the application processor processes an application program for playing an encoded audios signal.

14. The method of claim 13, wherein the audio signal is encoded with an MP3 or AAC format.

15. The method of claim 11, wherein the post processing comprises:
    selecting at least one of post-processing methods; and
    post-processing a signal decoded according to the selected post-processing method.

16. The method of claim 15, wherein selecting the post-processing method comprises selecting at least one of post-processing methods including equalizing, base enhancement, automatic volume limiting, high frequency band improvement, noise reduction, volume setting, and three-dimensional sound.

17. The method of claim 11, wherein the radio signal is an FM radio signal.

* * * * *